(12) United States Patent
Toshiaki et al.

(10) Patent No.: US 8,942,120 B2
(45) Date of Patent: Jan. 27, 2015

(54) REPUTATION-BASED ROUTING AND ERROR-CORRECTION CODING IN AD HOC NETWORKS

(75) Inventors: Koike-Akino Toshiaki, Medford, MA (US); Chunjie Duan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 148 days.

(21) Appl. No.: 13/480,349

(22) Filed: May 24, 2012

(65) Prior Publication Data

US 2013/0315077 A1 Nov. 28, 2013

(51) Int. Cl.
*H04L 12/26* (2006.01)
*H04W 24/00* (2009.01)

(52) U.S. Cl.
CPC ..................................... *H04W 24/00* (2013.01)
USPC ......................................................... 370/252

(58) Field of Classification Search
None
See application file for complete search history.

(56) References Cited

U.S. PATENT DOCUMENTS 7,948,966 B2 * 5/2011 Hughes et al. ................. 370/351
2008/0161001 A1 * 7/2008 Holcman et al. .............. 455/436

OTHER PUBLICATIONS

S. Buchegger and J.-Y. Le Boudec, "A robust reputation system for mobile ad-hoc networks," Technical report, IC/2003/50, EPFL-IC-LCA, 2003.
S. Buchegger and J. Y. Le Boudee. "Self-policing mobile ad hoc networks by reputation systems," Communications Magazine, IEEE, 43(7):101-107, 2005.>.
Pietro Michiardi and Refik Molva, "Core: A collaborative reputation mechanism to enforce node cooperation in mobile ad hoc networks," CMS, Portoroz, Solvenia, 2002.
Yan Lindsay Sun, Wei Yu, Zhu Han, and K J Ray Liu, "Information theoretic framework of trust modeling and evaluation for ad hoc networks," IEEE JSAC, 24(2), 2006.
Saurabh Generiwal, Laura K. Balzano, and Mani B. Srivastava, "Reputation-based framework for high integrity sensor networks," ACM Trans. Sen. Netw., 4(3):1-37, 2008.
G. Theodorakopoulos and J. Baras, "On trust models and trust evaluation metrics for ad hoc networks." IEEE, JSAC, 24(2);Feb. 2006.
V. Daza, J. Domingo-Ferrer, F. Sebe, and A. Viejo. Trustworthy "Privacypreserving car-generated announcements in vehicular ad hoc networks," IEEE Trans. VT, 58(4):1876-1886, Jul. 2009.
Qianhong Wu, J. Domingo-Ferrer, and U. Gonzalez-Nicolas, "Balanced trustworthiness, safety, and privacy in vehicle-to-vehicle communications," IEEE Trans. VT, 59(2):559-573, Feb. 2010.
Ze Li and Haiying Shen. A hierarchical account-aided reputation management system for large-scale manets IEEE INFOCOM, Shanghai, Apr. 2011.

(Continued)

*Primary Examiner* — Rhonda Murphy
(74) *Attorney, Agent, or Firm* — Dirk Brinkman; Gene Vinokur

(57) ABSTRACT

Nodes in an ad hoc mobile network are monitored to provide secure routing of packets. Malicious or selfish behaviors by nodes are used to maintain and distribute node reputations. Based on the reputation, the most secure route, which can have multiple paths, is selected for packet communications. In conjunction with secure routing, a forward error correction code is adaptively optimized according to the reputation through every adjacent nodes along the route to avoid eavesdropping and falsification by malicious nodes.

17 Claims, 8 Drawing Sheets

(56) References Cited

OTHER PUBLICATIONS

Riaz Ahmed Shaikh, Hassan Jameel, Brian J. dAuriol, Heejo Lee, Sungyoung Lee, and Young-Jae Song. Group-based trust management scheme for clustered wireless sensor networks. IEEE Trans. Parallel Distributed Systems, 20(10), Nov. 2009.

Zhengqiang Liang and Weisong Shi. Analysis of ratings on trust inference in open environments. Perform. Eval., 65 (2):99-128, 2008.

* cited by examiner

Monitor exiting

Monitor entering

REPUTATION-BASED ROUTING AND ERROR-CORRECTION CODING IN AD HOC NETWORKS

FIELD OF THE INVENTION

This invention relates generally to wireless communications, and more particularly to monitoring relay nodes in mobile ad-hoc networks.

BACKGROUND OF THE INVENTION

In a mobile ad hoc network (MANET) of nodes, nodes can move independently, which changes the network topology. Communication of packets in a MANET is usually multi-hop, and each node can forward packets for other nodes. However, the transmission power, computational ability and available bandwidth for the node is limited.

Because MANET lacks a structure for autonomous peer nodes, MANET is prone to selfish behaviors and malicious attacks. MANET is inherently insecure and untrustful. Selfish relay nodes can drop packets to reduce their power consumption, and extend battery life. Therefore, selfish behavior should be detected and identified. Packets can also be falsified by relays.

One of the solutions preserves security in MANET by including a reputation system to monitor misbehaving nodes. The reputation of a node is treated as a measure of uncertainty and confidence to evaluate trust in MANET. That scheme uses a modified Bayesian estimation method, or a self-policing reputation mechanism. The scheme is based on local observations at the nodes. The scheme leverages second-hand trust information to rate and detect the misbehaving nodes.

For a large-scale MANET, hierarchical reputation management can be considered, e.g., with combination between reputation and price systems. A distributed hash table approach can be implemented to store reputation records.

SUMMARY OF THE INVENTION

Embodiments of the invention provide a method for monitoring relay nodes in an ad hoc mobile network (MANET). The monitoring detects the malicious behavior of relay nodes to maintain and distribute the reputations of the node.

Based on the reputation, a most secure route is selected for packet communications. The route can have multiple paths.

In conjunction with secure routing, a forward error correction (FEC) code is adaptively optimized according to the reputation. Then, packets are forwarded from a source to a destination, via relays, using the multiple paths while minimize eavesdropping and falsification.

DETAILED DESCRIPTION OF THE PREFERRED EMBODIMENTS

The embodiments of the invention provide a method and system for monitoring relay nodes in a mobile ad hoc network (MANET) by a monitor. The monitor is one or more of the nodes in the network. The steps of the method described herein can be performed by a processor connected to input/output interfaces at the monitor node. Each node includes a transceiver, to transmit and receive packets. The packets can include payload data.

One object of the invention is to secure the payload data in packets from malicious relay nodes, which could potentially drop or falsify packets. Therefore, it is understood that when packets are discussed that it is the payload that is of special concern. It is understood that the packets can also include other data such as routing information, which can be updated as the packets are forwarded from a source to a destination, and which can be read by all nodes during the forwarding process.

Figure 1:
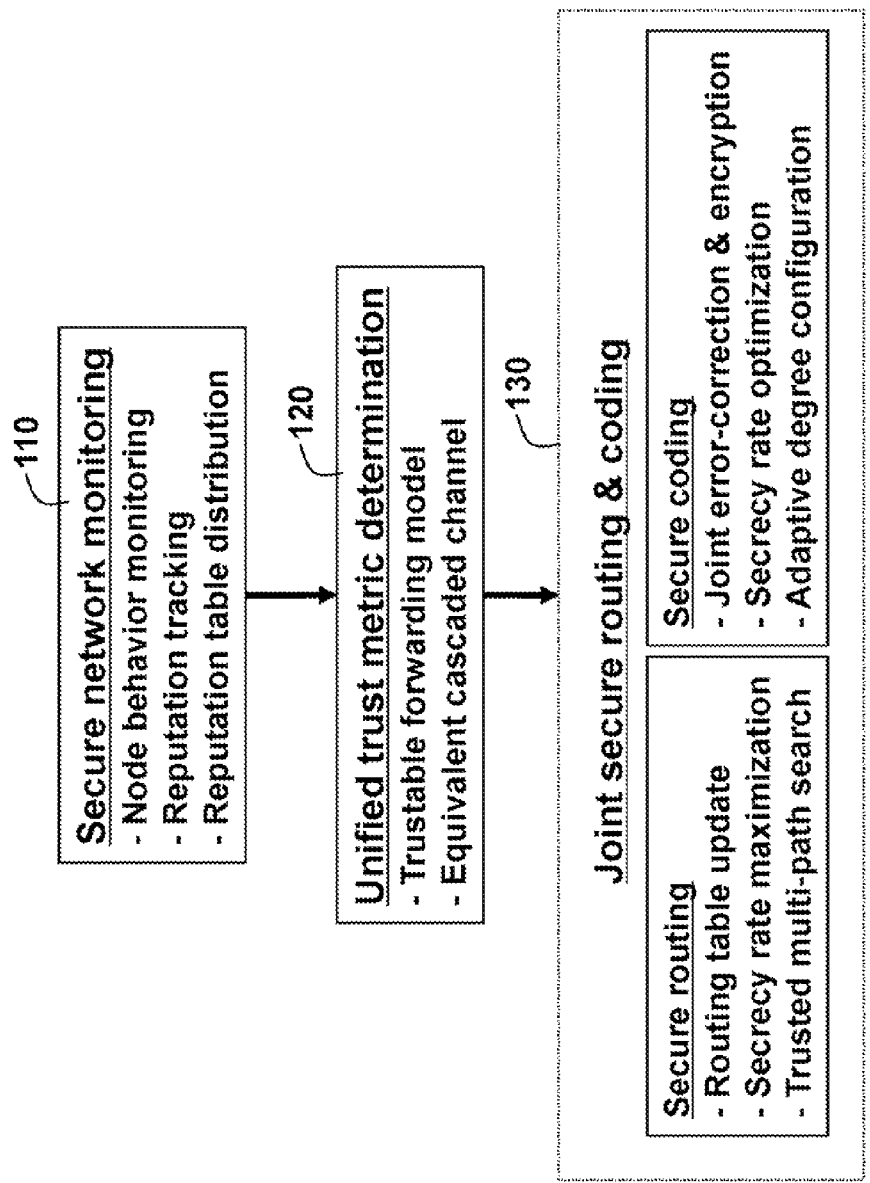
FIG. 1 is a flow diagram of a method for improving network security with monitoring, routing and coding according to embodiments of the invention.

FIG. 1 shows the overview of the method according to the embodiment of the invention. The method includes the following blocks; secure network monitoring 110, unified trust metric determination 120, and joint secure routing and coding 130. The blocks monitor relay nodes, and perform reputation based tracking. The blocks also distribute reputation tables.

The first block 110 monitors any misbehavior of malicious relay nodes by generating and distributing a reputation table. This block uses a trusted forwarding model, and an equivalent cascaded channel model of malicious behavior.

The second block converts the information in the reputation table into a quantitative trust metric based using the equivalent channel model of the misbehavior.

The third block 130 optimizes jointly secure and coding to maximize security based on the trust metric by selecting the most trusted nodes and adapting the coding structure to be secure in the presence of untrusted relay nodes.

This block has two subblocks: secure routing, and secure coding. The secure routing updates routing tables, maximizes the secure, and performs a trusted multi-path search. The secure coding uses joint error-correction and encryption to maximize the security. The block can perform adaptive degree configuration.

We consider a homogeneous MANET including wireless communication nodes. The nodes can enter and exit the network at will. Therefore, the network lacks a centralized trust or a centralized infrastructure. The joining operation can be achieved via a coalition of existing nodes to allow network access to a new node.

Due to the transmission power limitation in MANET, communications from a source to destination can take multiple hops along a route of adjacent relay nodes. A node is adjacent when the node is within wireless transmission range of another node.

Cryptographic mechanisms can be used to protect authentication, integrity and non repudiation of the packets. Private and public key pairs are generated for the nodes. When nodes join the network, the nodes generate certificates based on the public-private key pairs.

Instead of storing certificates in centralized certificate repositories, certificates in the MANET environment are distributed by and stored at nodes. Nodes fully control local security setting. The certificates must be signed by the network, i.e., a certain number of adjacent nodes in the network. Each node has a unique identification.

The embodiments of the invention use monitoring structure to determine the reputation of the relay nodes by tracking network traffic, and how packets are forwarded by the relays.

Figure 2:
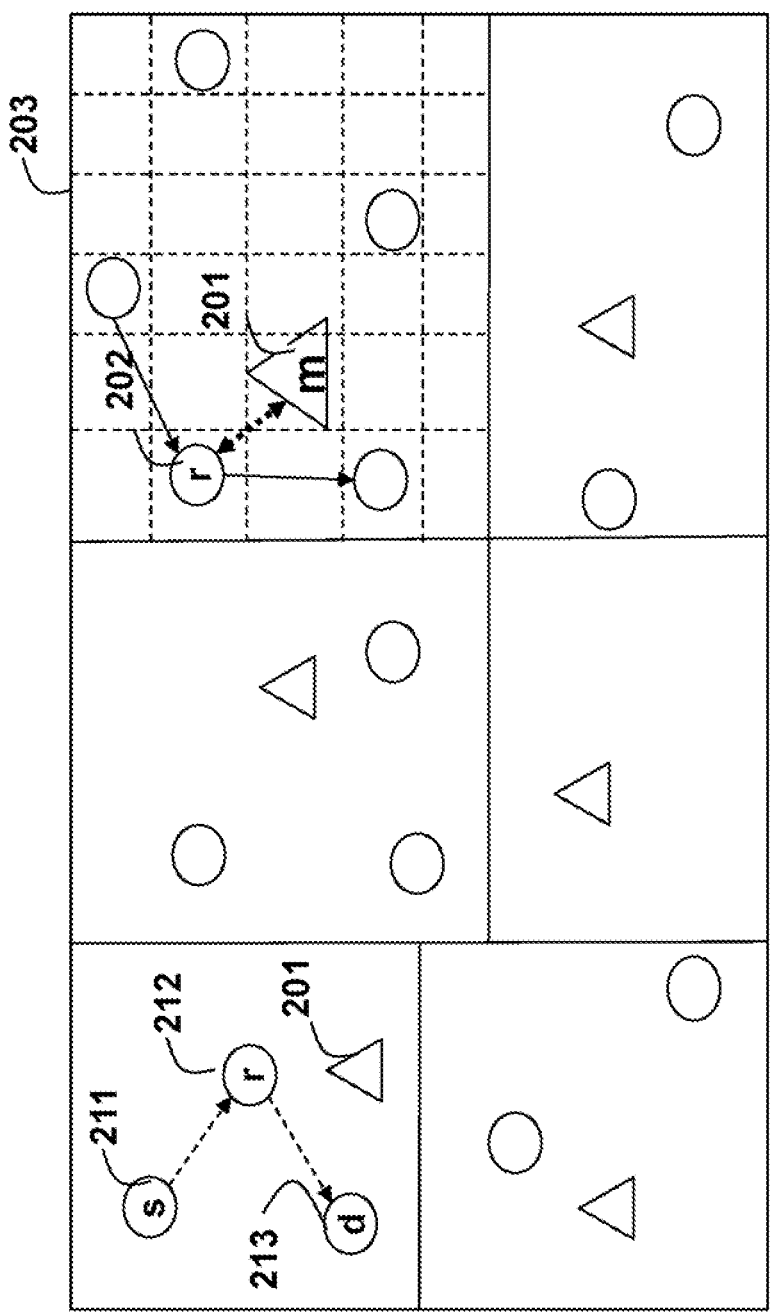
FIG. 2 is a schematic of a configuration of a monitoring system according to embodiments of the invention.

FIG. 2 shows the conceptual architecture constructed as part of a routable MANET environment. The network includes source nodes 211, relay nodes 212, and destination nodes 213. Some nodes 201 monitor the packet forwarding behaviors of relay nodes r 202 in a zone 203. These nodes constitute a set of monitors. Each monitor is able to receive the network traffic within range.

The total number of packets that each relay node receives and transmits is recorded. To increase accuracy, among all the packets each node received, if the node is the source s or destination d for the packet, the packet is not counted.

The set of monitors maintains a routing table that stores the Internet Protocol (IP) address and location of each adjacent node using a 2D coordinate system for the zone. A node routes packets towards the destination. The node determines which neighboring zone is closest to the destination node, and then looks up the IP address in the routing table.

We use distributed a hash table (DHT) based storage and processing structure to achieve scalable and self-organizing. The architecture is a virtual 2-dimensional space, a type of overlay network. This 2-dimensional coordinate space is a virtual logical address. The entire coordinate system is dynamically partitioned among all the nodes in the network such that every node possesses at least one distinct zone within the overall space.

Figures 3A, 3B:
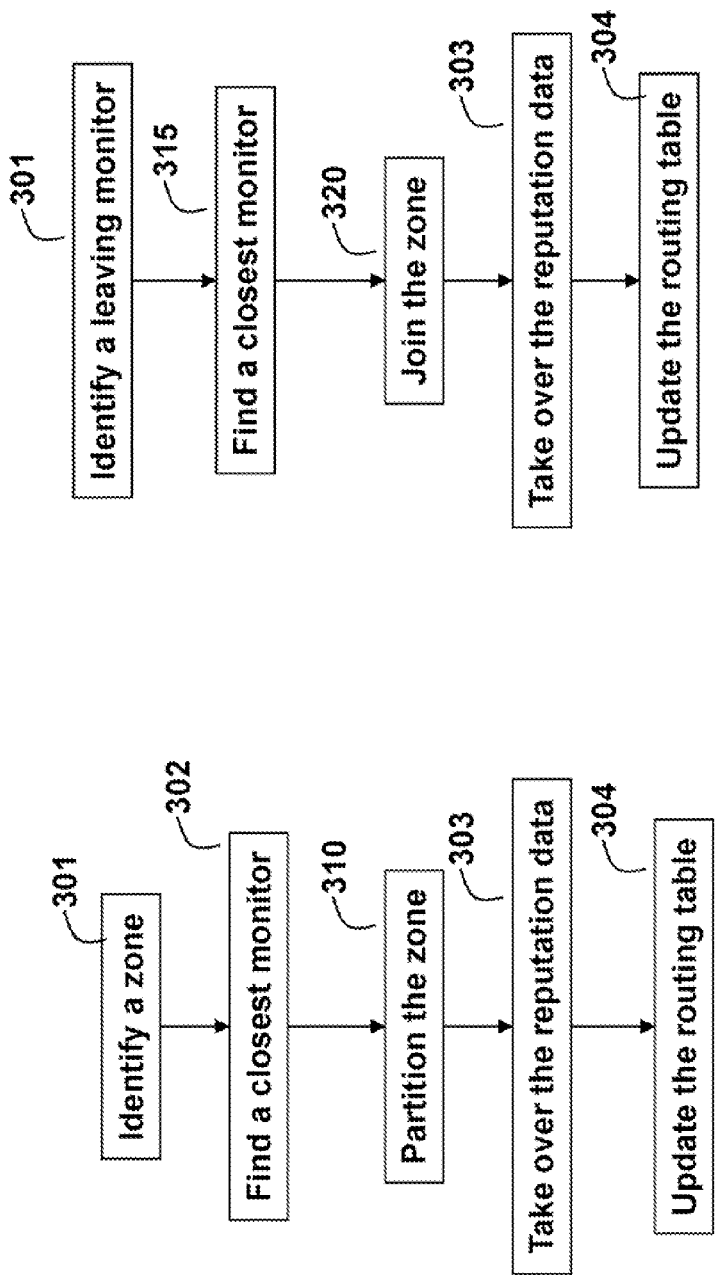
FIGS. 3A-3B are flow diagrams of updating reputation and routing tables when a monitor node enters or exits the network according to embodiments of the invention.

FIG. 3A shows the block diagram to maintain reputation and routing tables when a monitor enters the MANET. FIG. 3B is for when the monitor exits the MANET. When a monitor enters the MANET, the monitor identifies 301 a zone in virtual and real coordinate. The monitor node finds 302 the closest monitor to partitions 130 the zone, and takes 303 over maintenance of the reputation data. Based on the updated zone, the routing table is updated 204.

When a monitor exits the MANET, the analogous procedure is taken place after the closest monitors identified 315 the exiting monitor, and the zone is joined 320 with some other zone.

Figure 4:
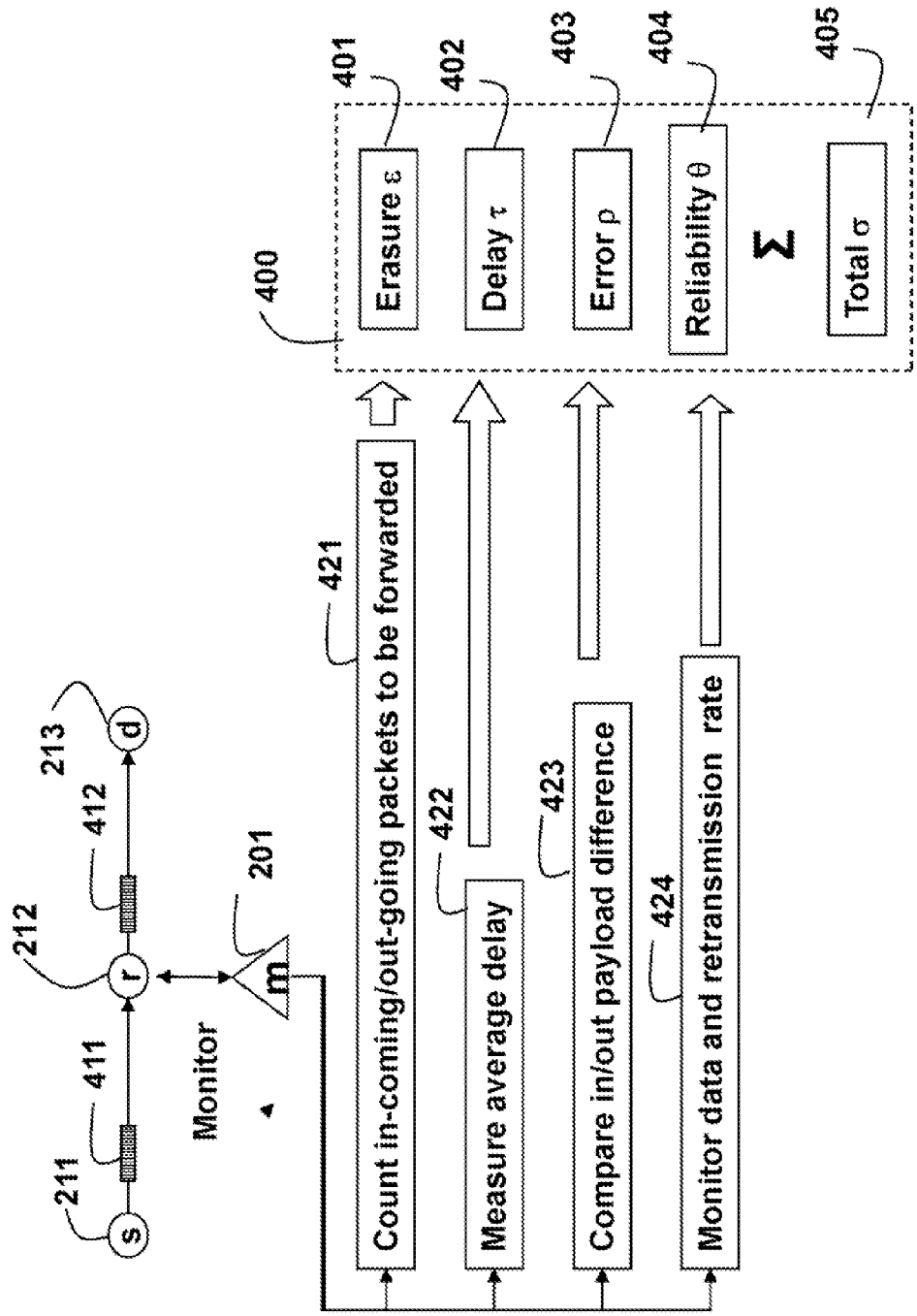
FIG. 4 is a schematic for generating reputation tables according to embodiments of the invention.

FIG. 4 shows the process of generating a table of reputations 400 for the relays 212 by monitoring packet forwarding behavior of that node.

The monitor counts 421 the number of coming received packets 411 and transmitted packets 412 at the relaying node, to establish an erasure rate $\epsilon$ 401. This reputation indicates how selfish the node is by not forwarding packets.

A delay (normalized by symbol duration) $\tau$ 402 for forwarding packets is measured 422. The delay indicates misbehaved queuing policies of the relaying node.

Comparing 423 the payload data of the corresponding received and transmitted packets determines an error rate $\rho$ 403 to indicate intentional falsification of data.

A channel reliability $\theta$ 404 is obtained by monitoring 424 the data rate of the received and transmitted packets and the number of retransmissions.

An overall reputation $\sigma$ 405 is determine by combining the above quantities $$\sigma = \{\epsilon, \tau, \rho, \theta\}.$$

The combining can be a weighted sum, wherein the weights assigned can indicate a relative importance of each reputation quantity.

All of the quantities 401-405 can be statistical, e.g., average, mean, probability, and the like.

The reputation table can be stored and distributed. This way nodes can select a route of nodes with good reputation when forwarding packets. A malicious node tends to have a high erasure rates, long delays, and high error rates, all contributing to a high "bad" reputation.

Figure 5:
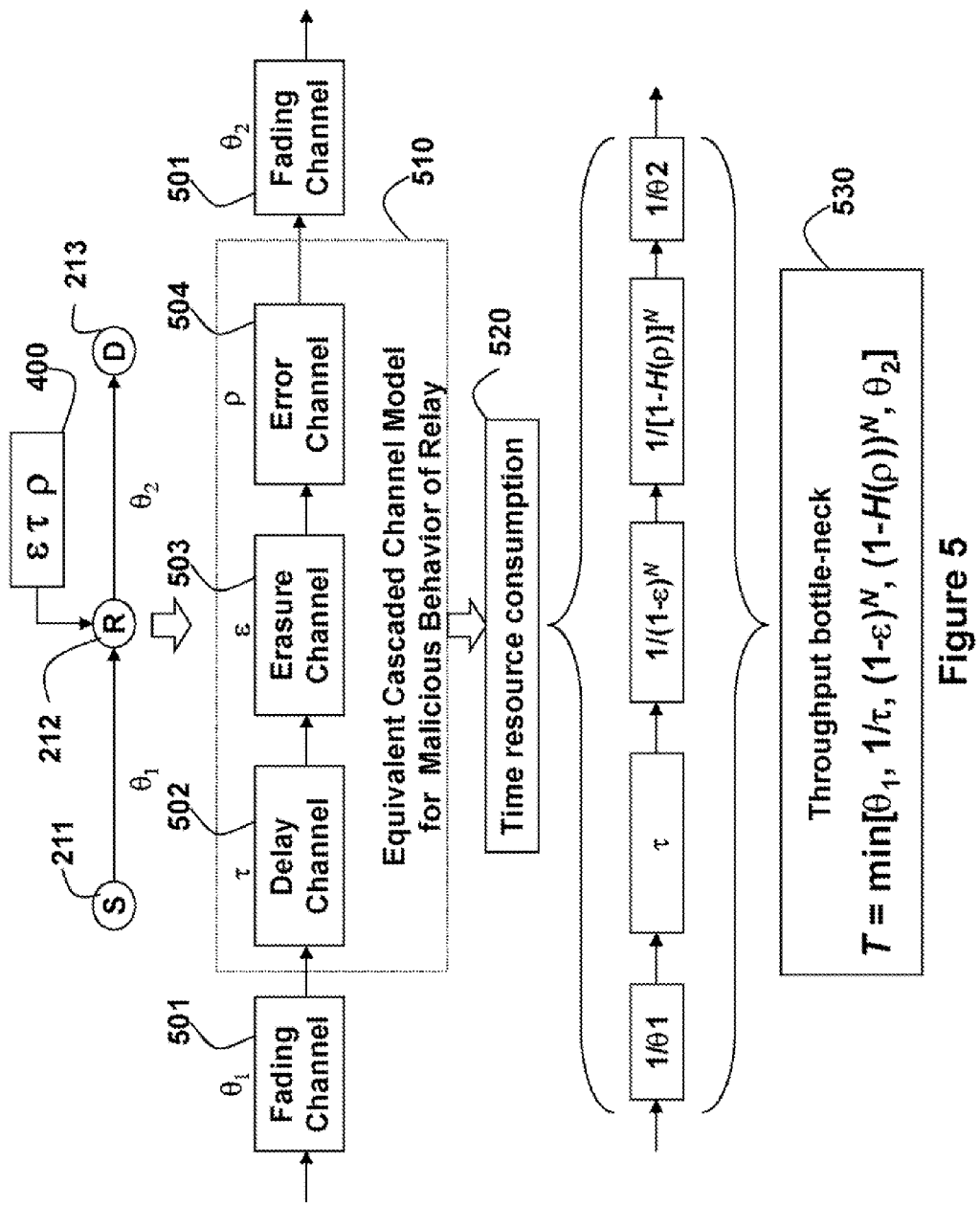
FIG. 5 is a schematic of an equivalent cascaded channel model of malicious behaving relaying nodes according to embodiments of the invention.

Based on the above reputations, one embodiment of the invention provides a unified way to represent the trust level by an equivalent cascaded channel model of malicious behavior as shown in FIG. 5.

The packet forwarding process is first expressed by an equivalent channel model of malicious behavior 510 including fading channels 501, delay channel 502, erasure channel 503, and error channel 504 corresponding to the reputation values 400.

For each channel, the expected time resource consumption 520 to forward packet is determined, e.g., $\tau$-symbol delay occurs in the delay channel, $1/(1-\epsilon)^N$-symbol delay occurs in the erasure channel because the channel capacity of binary erasure channels (BEC) is $1-\epsilon$, and a $1/(1-H(\rho))^N$-symbol delay occurs caused in the error channel monitor because the channel capacity of binary symmetric channels (BSC) is $1-H(\rho)$, where N and H(.) denote an average hit length of the packets, and a binary entropy function, i.e., $H(\rho) = -\rho \log(\rho) - (1-\rho p)\log(1-\rho)$, respectively.

Considering the wireless link is fading channel of the capacity $\theta$, the equivalent cascaded channel model for malicious behavior for forwarding packets can be evaluated by a weighted sum of the time resource consumption 520 of $1/\theta, \tau, 1/(1-\epsilon)^N$, and $1/(1-H(\rho))^N$ in a unified way.

Other channel representations rather than BEC and BSC can be used in practice. The weighted sum of the channel delays can be used to select most trustable node for relaying.

Another unified trust metric is based on the bottle-neck throughput T 530 along the cascaded channel. It is obtained by a weighted minimum of a capacity of each channel.

$$T = \min[\theta_1, 1/\rho, (1-\epsilon)^N, (1-H(\rho))^N, \theta_2].$$

Figure 6:
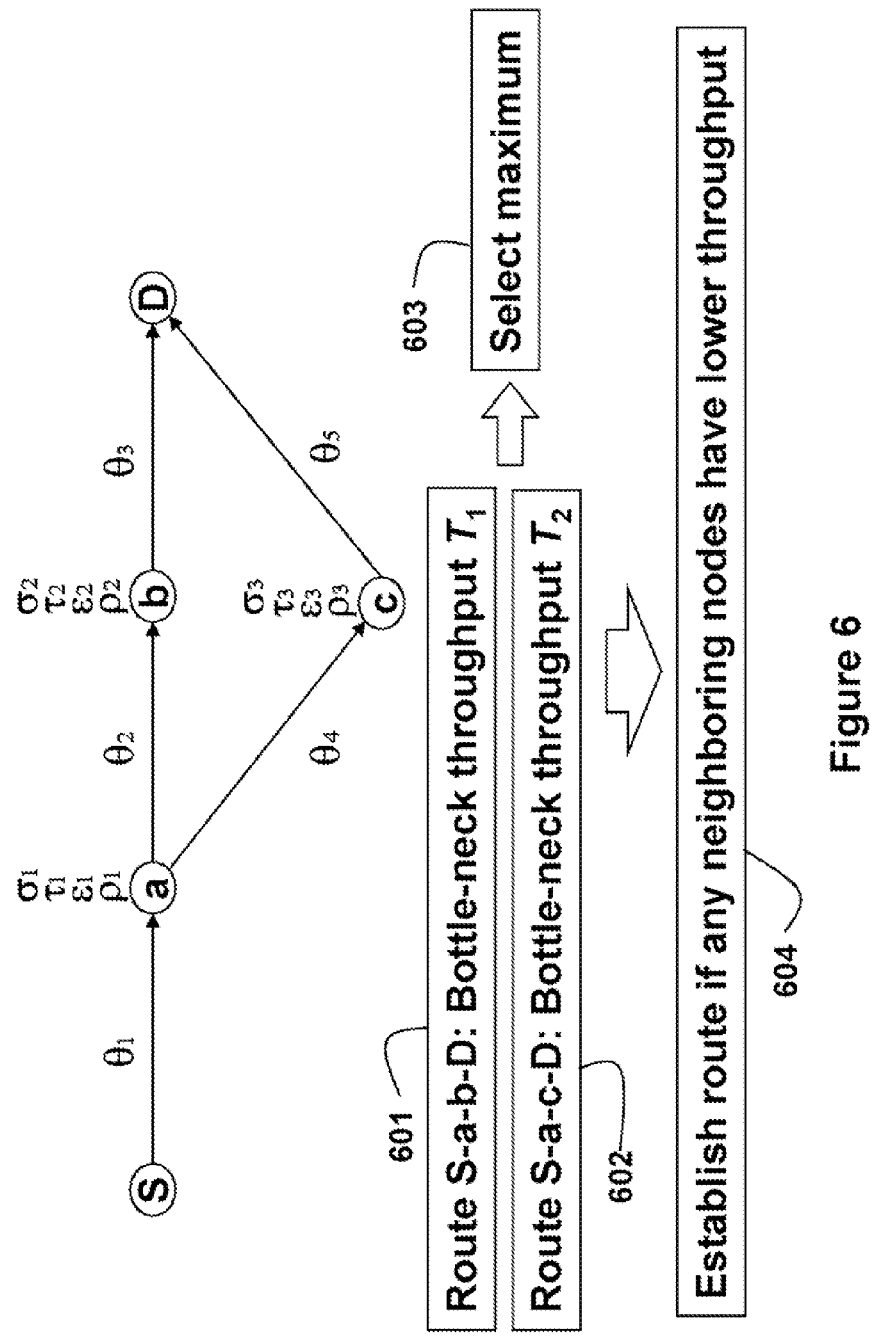
FIG. 6 is a schematic of selecting a secure route based on the reputation table according to embodiments of the invention.

FIG. 6 shows the method of secure routing based on the reputation table. In this example, packets are transmitted from a source node S to a destination node D, through multiple relaying nodes a, b, or c. There are two possible routes: S-a-b-D 601, and S-a-c-D 602. The method selects the most trusted route which has the maximum bottle-neck throughput 603 along the route, while the risk of eavesdropping is taken into account as well.

When the node b had a higher bottle-neck throughput than does the node c, the route S-a-b-D is selected if its throughput is larger than the eavesdropping throughput at the node c. The route is established 604 if any neighboring nodes have lower throughput.

Figure 7:
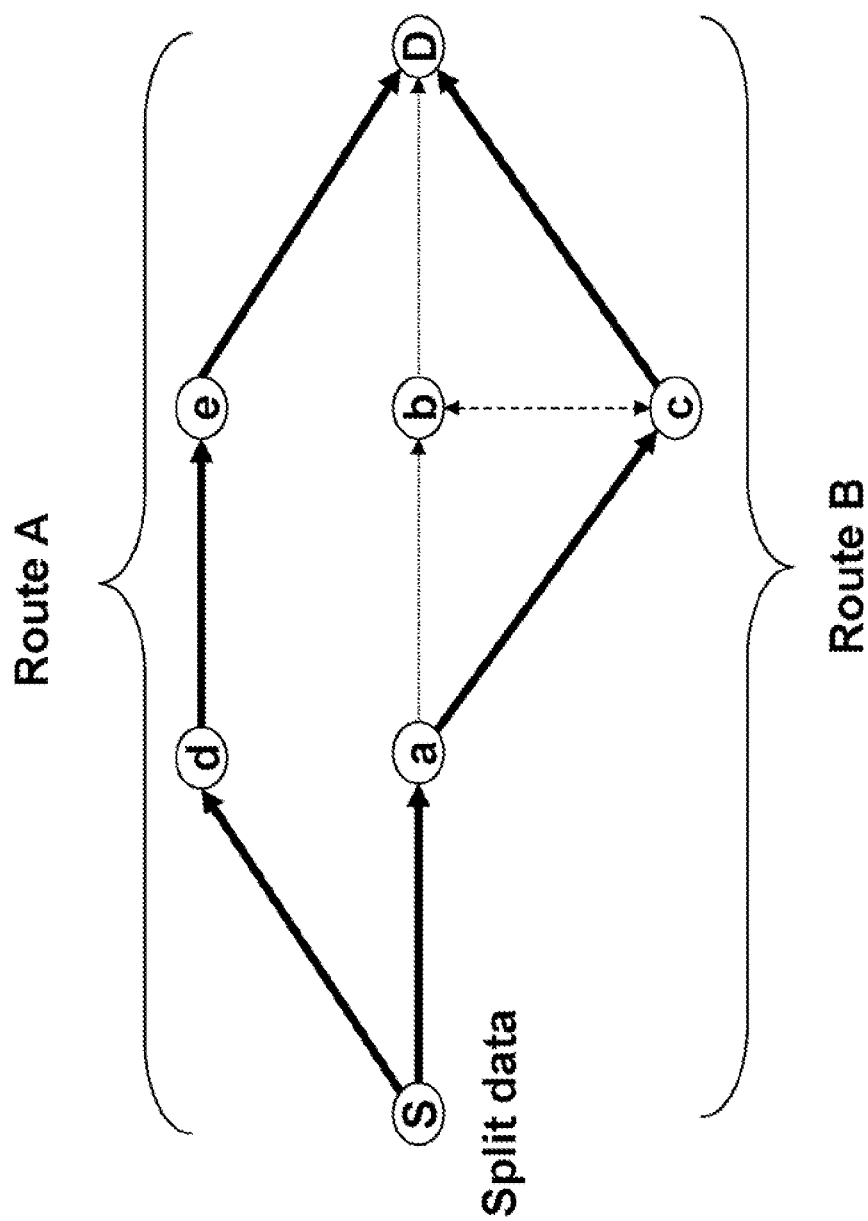
FIG. 7 is a schematic of a secure multi-path route method based on the reputation table according to embodiments of the invention.

As shown in FIG. 7, the embodiments can use multiple path routes at the same time to improve security. In FIG. 7, the source node S partitions packet streams over two routes A and B. The relaying is more secure because the node e does not know the packets through the route B, and eavesdropping nodes b and c cannot have any information of the route A. This embodiment determines the maximum secrecy throughput for possible selection of multiple paths, and the optimum route is established if the potential risk of eavesdropping is lower than a pre-defined threshold.

Figure 8:
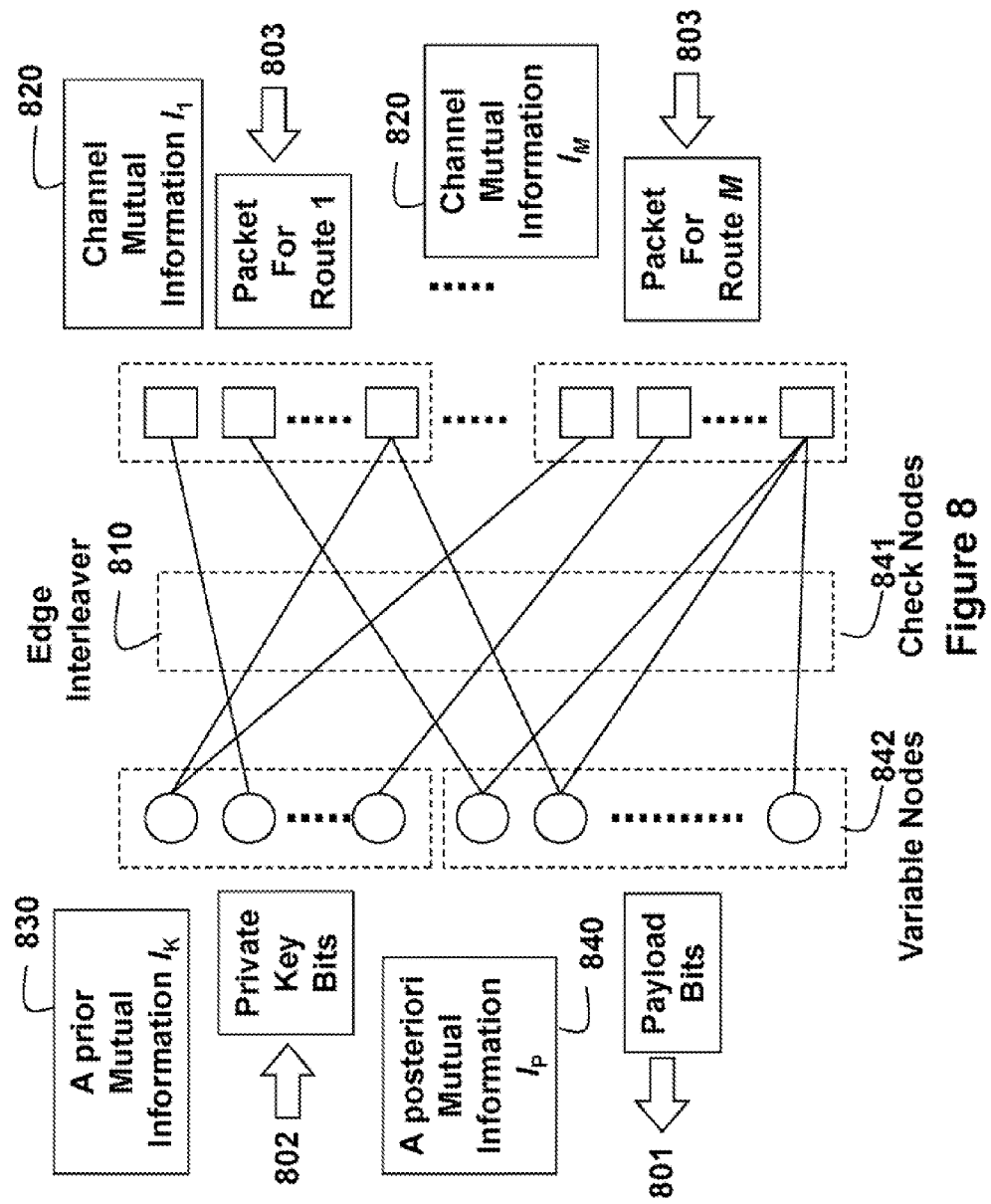
FIG. 8 is a schematic of an adaptive forward-error-correction (FEC) coding based on the reputation table according to embodiments of the invention.

FIG. 8 shows a joint encryption and forward error-correction (FEC) coding according to embodiments of the invention. The bits in the payload data 801 of the packets 803 are encoded with private keys 802 by generating exclusive-or (XOR) check sum through an edge interleaver 810, such as a capacity approaching low-density parity check (LDPC) code.

The generated check sums are partitioned into M blocks, where M is the number of paths of the route established by the secure routing scheme as describe above. The size of each block is optimized according to the throughput of each routes.

The expected mutual information $I_m$ 820 for channel m is monitored. The mutual information for different channels is not identical. A degree distribution of check nodes 841 of each block and a degree distribution of variable nodes 842 connecting to each block are designed jointly. Only the nodes that have the knowledge of private key can use higher a priori mutual information $I_K$ 830 of the keys. A higher a priori mutual information $I_K$ provides a higher a posteriori mutual information $I_P$ 840 of the data bits. Some untrusted nodes can have some knowledge of the private keys. Hence, the method optimizes the degree distribution to maximize the secrecy mutual information between the a posteriori mutual information of intended nodes, and mutual information of intended nodes.

The design is based on curve fitting of an extrinsic information transfer (EXIT) chart given $I_1, \ldots, I_M, I_K$, and $I_P$. The EXIT chart can be used to construct iteratively-decoded error-correcting codes, in particular LDPC codes and Turbo codes.

The mutual information can be obtained by the equivalent cascaded channel model for each established routes, as described above. This embodiment considers non-identical a priori mutual information transmitted through different channels.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for monitoring a relay node in an ad hoc wireless network of nodes, wherein the monitoring is performed by a monitor node, comprising the steps:
   determining an erasure rate by counting packets received and transmitted by the relay node;
   determining a delay between the corresponding packets received and transmitted;
   determining an error rate by comparing the corresponding packets received and transmitted;
   determining a channel reliability by monitoring data rates of the received and transmitted packets; and
   combining the erasure rate, the delay, the error rate, and the channel reliability to determine a reputation of the relay node, and wherein the packets are encoded with a low-density parity check (LDPC) code, wherein the receiving and the transmitting of the packets is a forwarding process expressed by an equivalent channel model of malicious behavior of the relay node, wherein the equivalent channel model includes in order a first fading channel based on the channel reliability of the received packets, a delay channel based on the delay, an erasure channel based on the erasure rate, an error channel based on the error rate, and a second fading channel based on the reliability of the transmitted packets, wherein the erasure rate is $\epsilon$, the delay is $\tau$, the error rate is $\rho$, the channel reliability is $\theta$, and reliability is $\sigma$, and an expected time resource consumption for the forwarding process is based on a $\tau$-symbol delay occurring in the delay channel, a $1/(1-\epsilon)^N$-symbol delay occurring in the erasure channel because a channel capacity of a binary erasure channel is $1-\epsilon$, and a $1/(1-H(\rho))^N$-symbol delay occurring in the error channel because the channel capacity of a binary symmetric channel (BSC) is $1-H(\rho)$, where N and H(.) denote an average bit length of the packets, and a binary entropy function $H(\rho)=-\rho \log(\rho)-(1-\rho) \log(1-\rho)$, respectively.

2. The method of claim 1, wherein the network is a mobile ad hoc network (MANET).

3. The method of claim 1, wherein the network includes a plurality of relay nodes, and the reputation of each relay node is distributed to all of the nodes.

4. The method of claim 1, wherein the packets are encrypted.

5. The method of claim 1, wherein the network includes a set of monitor nodes, and the network is partitioned into zones, and the nodes in each zone are monitored by one of the monitor nodes in the set of monitor nodes.

6. The method of claim 5, wherein each monitor node maintains a routing table that stores Internet Protocol (IP) address and location of each adjacent node using a 2D coordinate system for the zone.

7. The method of claim 6, wherein the routing table uses a distributed a hash table.

8. The method of claim 5, wherein the zones are partitioned and joined as the monitor nodes enter and exit the network, respectively.

9. The method of claim 1, wherein the erasure rate, the delay, the error rate, the channel reliability, and the reputation are statistical quantities.

10. The method of claim 1, wherein the combining is a weighted sum.

11. The method of claim 1, wherein the packets are forwarded from a source node to a destination node using a route with multiple paths, wherein the multiple paths use multiple relay nodes.

12. The method of claim 11, wherein the packets are forwarded along the multiple paths based on throughput.

13. The method of claim 11, wherein the packets are forwarded along the multiple paths, and wherein each packet is partitioned into M blocks, there being a block for each path.

14. The method of claim 1, wherein the packets are encoded with private keys.

15. The method of claim 1, wherein a design of the LDPC uses an extrinsic information transfer chart.

16. The method of claim 1, wherein the equivalent channel model is evaluated by a weighted sum of time resource consumption of $1/\theta$, $\tau$, $1/(1-\epsilon)^N$, and $1/(1-H(\rho))^N$ in a unified way.

17. The method of claim 1, wherein a throughput of the equivalent channel is $$T=\min[\theta_1, 1/\tau, (1-\epsilon)^N, (1-H(\rho))^N, \theta_2].$$

* * * * *